(12) United States Patent
Bazin et al.

(10) Patent No.: US 11,362,314 B2
(45) Date of Patent: Jun. 14, 2022

(54) STORAGE DEVICE AND MANUFACTURING METHOD

(71) Applicant: COMMISSARIAT A L'ENERGIE ATOMIQUE ET AUX ENERGIES ALTERNATIVES, Paris (FR)

(72) Inventors: Arnaud Bazin, Grenoble (FR); Sami Oukassi, Grenoble (FR); Severine Poncet, Grenoble (FR); Christophe Secouard, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 120 days.

(21) Appl. No.: 16/862,625

(22) Filed: Apr. 30, 2020

(65) Prior Publication Data

US 2020/0350569 A1 Nov. 5, 2020

(30) Foreign Application Priority Data

May 2, 2019 (FR) ..................................... 19 04614

(51) Int. Cl.
| | | |
|---|---|---|
| *H01M 4/04* | (2006.01) | |
| *H01G 11/28* | (2013.01) | |
| *H01G 11/86* | (2013.01) | |
| *H01M 4/139* | (2010.01) | |
| *H01M 4/36* | (2006.01) | |
| *H01M 4/525* | (2010.01) | |

(52) U.S. Cl.
CPC .......... *H01M 4/0423* (2013.01); *H01G 11/28* (2013.01); *H01G 11/86* (2013.01); *H01M 4/0492* (2013.01); *H01M 4/139* (2013.01); *H01M 4/366* (2013.01); *H01M 4/525* (2013.01)

(58) Field of Classification Search
CPC .. H01M 4/0423; H01M 4/0426; H01M 4/139; H01M 4/0492
See application file for complete search history.

(56) References Cited

U.S. PATENT DOCUMENTS

| 9,899,661 B2 | 2/2018 | Huang et al. |
| 2011/0311883 A1 | 12/2011 | Oukassi et al. |

(Continued)

FOREIGN PATENT DOCUMENTS

| EP | 2 833 461 A1 | 2/2015 |
| EP | 3 012 886 A1 | 4/2016 |

(Continued)

OTHER PUBLICATIONS

French Preliminary Search Report dated Nov. 27, 2019 in French Application 19 04614 filed on May 2, 2019 (with English Translation of Categories of Cited Documents & Written Opinion), 10 pages.

*Primary Examiner* — Amanda C. Walke
(74) *Attorney, Agent, or Firm* — Oblon, McClelland, Maier & Neustadt, L.L.P.

(57) ABSTRACT

An electrode, in particular for micro-batteries, produced in a plurality of layers with intermediate steps of masking a first layer leaving some parts of the latter exposed in order next to produce a removal of material eliminating defects. After removal of the masking layer, the second layer can be formed. Other layers can then follow in the same way.

9 Claims, 3 Drawing Sheets

(56) References Cited

U.S. PATENT DOCUMENTS

| | | | |
|---|---|---|---|
| 2014/0335411 A1* | 11/2014 | Liu | B81C 1/00539 |
| | | | 216/11 |
| 2015/0027979 A1 | 1/2015 | Oukassi et al. | |
| 2016/0118645 A1 | 4/2016 | Oukassi et al. | |
| 2017/0062834 A1* | 3/2017 | Unnikrishnan | H01M 10/0436 |
| 2018/0351156 A1* | 12/2018 | Rojeski | H01G 13/04 |
| 2019/0363339 A1* | 11/2019 | Zhu | H01M 10/052 |

FOREIGN PATENT DOCUMENTS

| | | |
|---|---|---|
| FR | 2 943 181 A1 | 9/2010 |
| KR | 10-0790844 B1 | 1/2008 |

\* cited by examiner

STORAGE DEVICE AND MANUFACTURING METHOD

TECHNICAL FIELD

The present invention relates to microelectronic devices having electrodes, in the field of the storage of energy electrochemically, in particular in the form of a micro-battery (thus implementing an electrochemical micro-storage component). The invention finds an application in the manufacture of microelectronic devices offering such storage. Microelectronic device means any type of device produced with microelectronic means. These devices encompass in particular, in addition to devices with a purely electronic purpose, micromechanical or electromechanical (MEMS, NEMS, etc.) devices as well as optical or optoelectronic (MOEMS, etc.) devices. This includes applications of the electrochemical micro-storage component type (micro-batteries, micro-supercapacitors, solid ionic components of any type.

A specific interest of the invention is therefore the production of electrochemical energy storage devices. This includes in particular devices of the battery type and in particular those to the microelectronic scale, referred to as micro-batteries, accumulators or capacitors using an electrolyte, preferably solid.

TECHNOLOGICAL BACKGROUND

Electrochemical energy storage systems are in general produced by successive depositions on a substrate of a first current collector, a first electrode, an ionic electrolyte or conductor, a second electrode, and a second current collector. An encapsulation, by means of a deposition of supplementary layers, or by transfer of a cap, is often necessary to protect the system from chemical reactivity with oxygen and water vapour.

Miniaturising devices involves being able to produce energy sources of small size, in particular a few millimeter square, capable of storing a sufficient quantity of energy for the application. The capacity of a micro-battery is directly proportional to the volume of the two electrodes, and in particular the positive electrode. The active surface of the latter is greatly limited by the end size of the micro-battery so that it can be integrated in the end device without excessively detrimental bulk. Thus one way that can be used for increasing the capacity of a battery while minimising the size thereof is to increase the thickness of the electrode, and in particular of the positive electrode. It is typically sought to exceed a thickness of 10 μm.

However, increasing this thickness causes surface defects related to the deposition method, which may cause the short-circuiting of the energy storage device. In particular, the electrode materials such as $LiCoO_2$ are normally deposited by cathodic sputtering methods that are constrained to small thicknesses, generally less than around ten microns. Moreover, an increase in electrode thickness causes volume defects, such as cracks and delaminations. The structure of a thick layer of electrodes is itself not well-controlled (grain size, crystalline orientation) so that the electrochemical performance is reduced.

An attempt at a solution to the abovementioned problem is proposed in the publication U.S. Pat. No. 9,899,661 B2, which presents the formation of an electrode by successive depositions. In particular, depositions of $LiCoO_2$ under argon and depositions of $LiCoO_2$ under an argon/oxygen mixture are alternated. The multilayer assembly resulting therefrom causes a rupture in growth nucleation and then a renucleation. A reduction in the annealing temperature of the material, necessary in order to obtain the correct crystalline phase from an electrochemical point of view, is also applied. This publication states that it is possible to obtain $LiCoO_2$ film thicknesses of more than 10 μm by this method. However, this multilayer deposition causes a heterogeneity of electrodes both in composition and in crystalline structure and therefore heterogeneity of the performances between the various layers.

One object is therefore to propose an electrode-manufacturing method offering, relative to a known electrode, and for an equivalent thickness, a manufacturing quality (in particular by reduction of defects) and improved electrical properties. This can for example allow great thicknesses without this being very detrimental, or even not detrimental, to the performances of the electrode, or even advantageous, especially from an electrical point of view.

The other objects, features and advantages will emerge from an examination of the following description and the accompanying drawings. Naturally, other advantages may be incorporated.

SUMMARY

To achieve this objective, one embodiment provides for a method for producing an electrode, in particular for an electrochemical energy storage device, wherein the electrode is obtained by the formation of a plurality of layers.

Advantageously, this method comprises:
i. a production of a first electrode layer by physical vapour deposition;
ii. formation of a masking layer on the first electrode layer, configured to cover a first portion of the exposed surface of the first electrode layer without covering a second, non-masked, portion of the exposed surface of the first electrode layer, the second portion comprising reliefs having an extension, in a thickness dimension of the electrode, greater than a maximum extension, along the thickness dimension of the electrode, of the first portion;
iii. removal of material of the first electrode layer by applying an etching solution to the first electrode layer as from the second portion;
iv. elimination of the masking layer;
v. production of a second electrode layer immediately on top of the exposed surface of the first electrode layer.
By virtue of this, it is possible to use the physical vapour deposition technique to produce all or some of the layers of the electrode to be produced whereas this technique generally causes very detrimental defects, limiting the thickness of the electrode that can be produced. The method preferably makes it possible to obtain high thicknesses, which are therefore favourable to good energy storage, with good quality of layers and a manufacturing method that is in itself well-controlled, which is physical vapour deposition.

Advantageously, $LiCoO_2$ is used for at least one of the layers of the electrode manufactured.

It also relates to a method for manufacturing an electrochemical energy storage device comprising the production of at least one first electrode by means of the method indicated above. Advantageously, a first collector is formed on a support and then the first electrode is produced on the first collector. Preferably, the method comprises the formation of other elements, in a stack on the previous ones; it may in particular be the case of an electrolyte, preferably in solid form and then a second electrode and a second collector.

Another aspect relates to an electrochemical energy storage device obtained by the method of the invention.

Another aspect relates to an electrode for an electrochemical energy storage device comprising a plurality of stacked layers, wherein that a first electrode layer in the plurality of stacked layers comprises at least one cavity formed in a hollow in the thickness thereof and in that a second electrode in the plurality of stacked layers, situated immediately above the first electrode layer, at least partly covers the exposed surface of the first electrode layer and fills at least one cavity.

Optionally, the at least one cavity comprises a cavity extending across the entire thickness of the first layer. Thus, the filling with the material of the second layer can in this case reach and come into contact with the material of the layer underlying the first layer, which may be the surface of a support of the surface of any other layer situated immediately below the layer comprising the cavity.

Another aspect relates to an electrochemical energy storage device, comprising a stack on a support, a first collector, a first electrode, an electrolyte, a second electrode and a second collector, at least one from among the first electrode and the second electrode.

BRIEF INTRODUCTION OF THE DRAWINGS

The aims, objects, features and advantages of the invention will immerge more clearly from the detailed description of an embodiment thereof that is illustrated by the following accompanying drawings, wherein.

Figure 6:
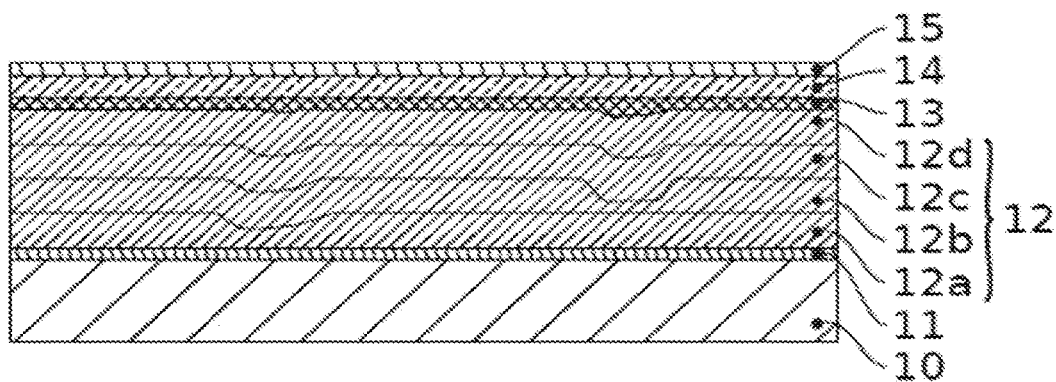

FIG. 6 procures an example of integration of a multilayer positive electrode in a micro-battery.

Figure 7:
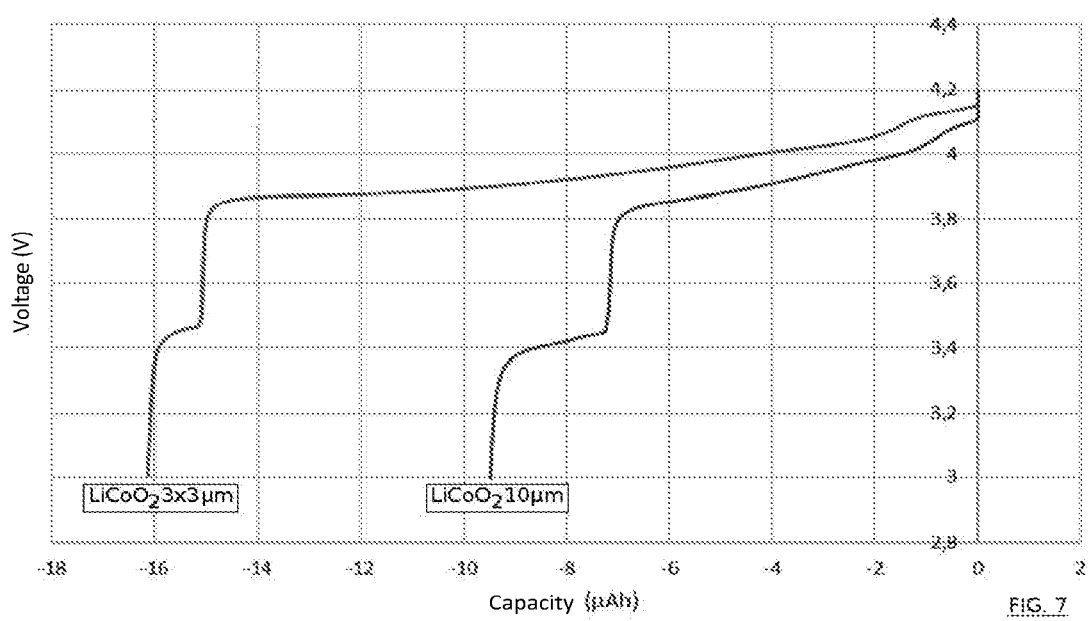

FIG. 7 is a curve revealing the advantageous result of the invention in terms of capacity obtained.

The drawings are given by way of examples and are not limitative of the invention. They constitute schematic outline representations intended to facilitate understanding of the invention and are not necessarily to the scale of practical applications.

DETAILED DESCRIPTION

Before beginning a detailed review of embodiments of the invention, optional features, which may optionally be used in association or in alternation, are stated below:

An annealing of the first layer is carried out after removal of the masking layer and before the second electrode layer is produced;

An annealing of the second layer is carried out after production thereof, or if at least one third layer is next formed, advantageously after removal of the masking layer on said second layer.

the second electrode layer 122 is produced by physical vapour deposition;

material is removed by applying an etching solution to the first electrode layer 121 as from the second portion;

$LiCoO_2$ is used for producing at least one from among the first electrode layer 121 and the second electrode layer 122;

a production of at least one third electrode layer on top of the second electrode layer 122 is included by reiterating steps ii) to v);

an annealing can be carried out of each electrode layer before the production of any other layer on top;

the thickness of a last electrode layer of the electrode 12, away from the first electrode layer 121, is less than those of the other electrode layers;

the formation of a masking layer 16 comprises the formation of at least one pattern 1212 passing right through the thickness of the masking layer 16 so as to expose the third portion of the first electrode layer 121, the removal being configured so as to produce a removal of additional material as from the third portion;

the electrode layers have a thickness greater than or equal to 1 μm and/or less than or equal to 10 μm;

at least two immediately successive layers from among the electrode layers have the same thickness;

the masking layer 16 can be formed with a resin-deposition step, preferably by spin coating.

It is stated that, in the context of the present invention, the term "on" or "on top of" does not necessarily mean "in contact with". Thus, for example, the depositing of one layer on another layer does not necessarily that the two layers are directly in contact with each other but means that one of the layers at least partially covers the other while being either directly in contact therewith or being separated therefrom by a film, or another layer or another element. A layer may moreover be composed of a plurality of sublayers of the same material or different materials; this is particularly the case with the electrode layer described below.

It is stated that, in the context of the present invention, the thickness of a layer or of the substrate is measured in a direction perpendicular to the surface along which said layer or substrate has its maximum extension. If a layer is not completely planar, in particular because it has defects that are liable to be in relief on the exposed face of said layer, the thickness means the dimension of said layer outside the defects thereof.

Some parts of the device of the invention may have an electrical function. Some are used for electrical conduction properties and electrode, collector or equivalent means elements formed from at least one material having sufficient electrical conductivity, in the application, for fulfilling the required function. Conversely, electrical insulator or dielectric means a material, which in the application fulfils an electrical insulation function.

Electrochemical energy storage device means a device functioning with a layer of electrolyte, preferably in solid form and, in conjunction with a lower electrically conductive functional part and an upper electrically conductive functional part, framing the electrolyte layer, allowing the storage of energy in the form of an increase in potential difference or evacuation of energy in the form of a reduction in potential difference. In the microelectronic field, it may be a case of micro-batteries, which means such devices with dimensions to the microelectronic scale, in particular with a global thickness of a few tens of microns, for example less than 100 microns.

Generally, an electrochemical energy storage device comprises two electrodes separated by an electrolyte. During the discharge, the anode (the negative electrode) is the seat of an oxidation, ions pass through the electrolyte and, at the cathode (a positive electrode), will undergo a reduction while coming to be interposed in a specific material (the host material); the electrons thus produced supply energy to the external circuit. During charging, the ions make the reverse path, the electrons being supplied by the external circuit.

Figure 1:
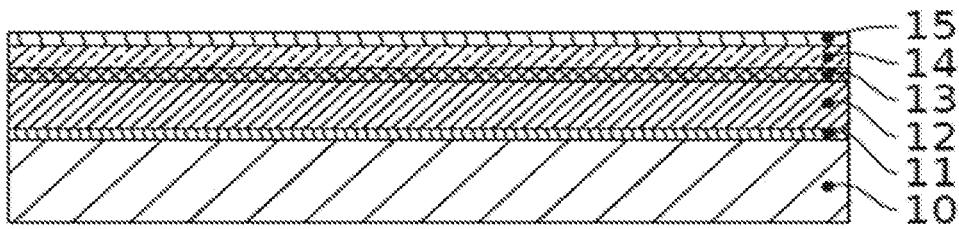
FIG. 1 depicts schematically a stack of layers intended to form a micro-battery.

FIG. 1 gives a purely schematic representation of a stack of various layers for forming a micro-battery. In this context, a support 10 can receive the rest of the stack and is for example formed with a sheet of semiconductor material such as silicon or any other organic or inorganic material, for example glass. If the support 10 is electrically conductive, it may comprise at least one superficial electrically insulating layer. This arrangement is not shown on the diagram in FIG. 1. The reference 11 corresponds to a first current collector. Within the meaning of the present application, the term collector means a part of the device the function of which is to connect an electrode to an element external to the device, that is to say situated outside the stack of layers of the device, generally encapsulated. It is possible to use metals with good electrically conductive properties for this part. This is the case with platinum; less expensive materials, such as titanium, are also possible.

The electrode in question in the example is here a first electrode 12 disposed above and in contact with the first collector, which then serves as a support for forming the electrode 12. The term electrode, for its part, means a part of the device in electrical continuity with an active layer (in particular an electrolyte, preferably solid, for the case of electrochemical storage). The first electrode 12 (or positive electrode used in a conventional lithium or sodium accumulator) can use various materials, such as $LiCoO_2$, $V_2O_5$, $TiS_2$, $LiMn_2O_4$, $NaMnO_2$ or $NaCoO_2$. It may comprise a material of composition ABX, A being an alkaline metal and preferably Li, B being a transition metal and preferably Co, X being oxygen (O) or phosphate ($PO_4$). In general, materials based on lithium-Cobalt and/or lithium-manganese can be used in the invention. As indicated previously, it is generally sought for the first electrode (here the cathode) to be fairly thick, in order to allow storage of a sufficient quantity of energy over a limited surface area. It is possible here to use thicknesses greater than or equal to 10 μm and preferably greater than or equal to 20 μm.

Opposite its contact with the first collector 11, the first electrode 12 is in contact with an electrolyte 13. Ionic conductive glasses and alkaline chalcogenides are among the inorganic solid electrolytes applicable to an all-solid battery. The corresponding material can be chosen from sulfides and vitreous oxysulfide electrolyte systems, as well as a series of sulfide-based superionic glass-ceramics $Li_2S$—$P_2S_5$, the $Li^+$ ion conductivity of which is comparable with that of liquid electrolytes. With regard to the electrolyte for sodium batteries, there exists the same family of glass, for example $Na_3PS_4$.

FIG. 1 next shows a second electrode, here forming the anode, on the other face of the electrolyte 13. For example, it may be silicon. A second collector 15 sits on top of it. As before, titanium can be used or another metal with conductive properties.

In general, in a normal context of a first electrode 12, with reference to FIG. 1, it is difficult to achieve a thickness of 10 μm without prohibitive impact on the quality of said first electrode, in particular with regard to the electrical efficiency after manufacture. This is because the increase in the electrode thickness gives rise to high morphological defectiveness often resulting in pronounced roughness and tortuousness on the surface of said electrode, and sometimes a delamination between the electrode and the current collector layer of the previous level; the result is a degradation in the electrical response of the component, often in the form of short-circuit and/or high leakage currents.

Figure 2:
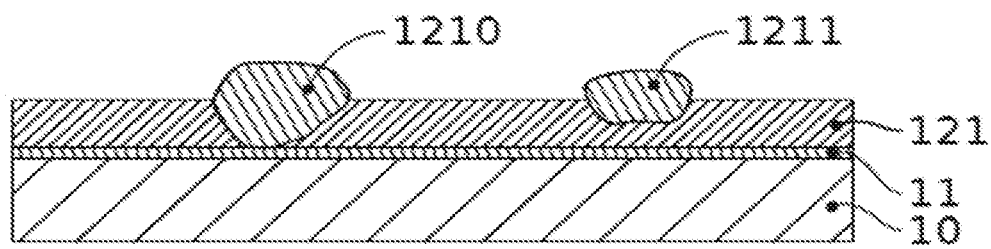
FIG. 2 depicts an example of a step of producing a first micro-battery electrode layer.

The method of the invention offers a solution to this problem and, with reference to FIG. 2, presents a step during which a first electrode layer 121 is formed above the collector 11. Preferentially, use is made of a physical vapour deposition, commonly known by the acronym PVD. The conditions of this deposition may be conventional. They cause defects as revealed by the portions 1210 and 1211. These may be growth defects in the form of incrustation with a poorly controlled crystalline structure. Some defects are such that they may extend over the whole of the thickness of the layer 121, as represented by the defect 1210. Other defects are more superficial, such as the one bearing the reference 1211. These defects form reliefs beyond an average surface of the layer 121, substantially oriented perpendicular to a thickness dimension of the various layers. In particular, these reliefs go beyond 1 μm, or even 2 μm, or 3 μm is possible. This may for example also represent more than 30%, or even be of the same order of magnitude as the thickness of the layer deposited in a single deposition step, for example 2 to 3 microns for a layer of 3 microns and 10 to 15 microns for a layer of 20 microns.

Figure 3:
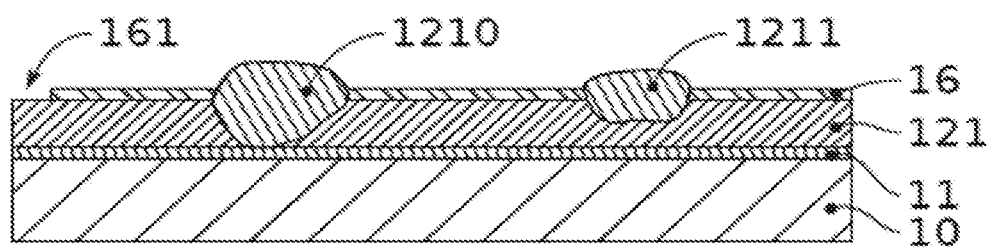
FIG. 3 shows an example of a step of producing a micro-battery electrode following the step in FIG. 2.

In FIG. 3, a masking layer 16 has been formed above the first layer 121. This formation is configured so as to cover portions of the layer 121 not affected by the relief defects 1210, 1211. Thus a portion of the defects is here exposed despite the presence of the masking layer 16. It will be understood that the thickness of the masking layer 16 is configured so as to be sufficiently fine so as not to completely cover the reliefs of the defects. Typically, the thickness of the masking layer 16 may be at least 1 μm, and/or preferably less than 4 μm, and more preferentially at least 1.5 μm and/or less than 2.5 μm. For example, the masking layer 16 may measure, in thickness, 2 μm with a margin of +/−0.2 μm.

The spin-coating technique is perfectly suitable for producing the masking layer 16. Normally, the first step is to apply resin to the exposed face of the layer 121 and a rotation of the support is produced. The centrifugal force thus generated distributes the resin on the surface. The conditions of the rotation, in particular the time and speed, make it possible to obtain a layer of the required thickness. It is then possible to harden the resin, by evaporation of the solvent thereof. The result illustrated in FIG. 3 shows a first portion of the first electrode layer 121 that is coated whereas a second portion of the electrode layer 121 remains exposed, without being protected by the masking layer 16. According to one example, the thickness of the masking layer 16 represents at least 20% of the thickness of the first electrode layer 121; as an alternative or in addition, the thickness of the masking layer 16 may represent at a maximum 70% of the thickness of the first electrode layer 121 and preferably at a maximum 30% of said thickness. Generally, the formation of the masking layer is configured so that it fills spaces around at least some reliefs 1210, 1211, filling in only part of the height separating the hollows (or the average surface of the layer in question and the top of the highest reliefs. In this way, advantageously, the second portion comprises at least one zone in the form of a little island of material of the first electrode layer 121 circumscribed by the masking layer, an island of material due to the projecting character of the defect reliefs. Thus, the surface of said island forms on the exposed surface of the first layer 121. The surface of said island has a higher altitude than the masking layer. It forms a top that is not covered during masking.

It will be noted that other parts of the first electrode layer 121 are optionally also exposed. This may be done by creating patterns in the material of the masking layer 16, by a photolithography phase for defining unprotected zones 161 of the layer 121. In particular, it will be seen in the following step that it is thus possible to laterally delimit the first electrode, in its layer 121.

Figure 4:
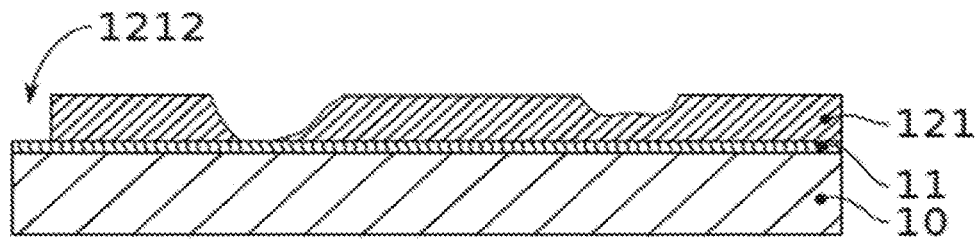
FIG. 4 shows a step following the step in FIG. 3.

This is because the following phase, illustrated in FIG. 4, is a phase of removal of material of the first electrode layer 121. The parts not protected by the masking layer 16 may be the site of an attack by the application of an etching solution. This may be a wet etching. The etching is done for example in a bath of $H_2SO_4$, the speed of the etching being in particular around 6 μm/min. An etching of around one minute is suitable for an initial layer 121 with a thickness of 10 μm outside the defects. In some cases, it is not desirable for the removal to be configured to reach the bottom of the layer 121 in order to completely remove a pattern. This is because some of them are in the form of incrustations, with a fragile interface with the rest of the layer 121, so that they have a propensity to be removed in the form of blocks. In this case, an etching, even not prolonged, may reach the interface of the defects and detach the defects. Naturally, in other cases, the effect of the etching is a more gradual removal. Generally, the etching is configured to produce a removal of the material of the first electrode layer 121 at least over the entire excess thickness of the defects 1210, 1211, beyond the average surface of the layer 121. More preferentially, the etching is configured to produce a complete removal of the defects. This is why the etching time indicated above is relatively important with respect to the thickness of the layer 121.

In the preferred case where the removal is figured to go beyond the average surface of the layer 121, said removal produces, at the non-masked portions, a cavity extending in a hollow in the thickness of the layer 121. Optionally, the cavity extends over the entire thickness of the layer 121. Generally, a plurality of cavities will be present in a layer. A plurality of layers, immediately successive or not, may each comprise one or more cavities. The cavities in a layer may have different forms and dimensions, and in particular different depths.

As indicated previously, the removal phase in question may also serve to form the first electrode 12, in the part thereof formed by the first layer 121. In this context, the reference 1212 in FIG. 4 represents the etching that was carried out simultaneously with the removal of the deposits, in order to laterally delimit the pattern of the first electrode. It will be understood that the step of the invention for eliminating unwanted reliefs on the layer 121 thus takes place in the context of another step, generally necessary, and not in the context of a supplementary step. It will be noted moreover that the situation in FIG. 4 corresponds to the situation after removal of the masking layer 16, subsequently to the removal of the material of the first electrode layer 121.

The step in question may be a shaping of the electrode layer, in particular in order to limit it laterally, and/or a step participating in the electrical connection or in the encapsulation.

Figure 5:
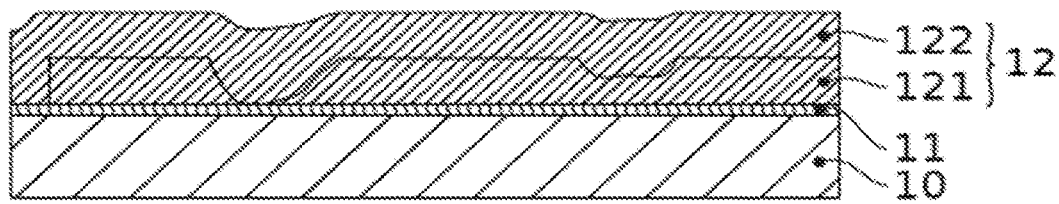
FIG. 5 shows schematically the formation of a second electrode layer.

FIG. 5 next shows the production of a second electrode layer 122 above the first layer 121 thus re-treated. Preferably, the PVD method is also used for forming said second layer. The hollows left by the previous removal phase can be attenuated by this deposition.

In accordance with a first possibility, the top layers of the stack, namely the electrolyte, the second electrode and the second collector, are second constructed.

According to another possibility, the steps in FIGS. 3 to 5 are reiterated so as to produce at least a third layer of the first electrode above the second 122. The phases of forming a masking layer, of removal of material that (this time in the second electrode layer), the removal of the masking layer and the deposition of the material of the third electrode layer are therefore used again. It will be noted that it is possible to continue the formation of the pattern, with characteristics equivalent to those of the exposed zone 161 and of the etched pattern 1212 explained previously.

It is possible to increase the number of sublayers forming the first electrode 12, and FIG. 6 gives the example of four sublayers, respectively 12a, 12b, 12c, 12d.

According to a first embodiment, the thickness of the layers is identical. According to another possibility, the thickness is decreasing, or at least the last layer (the one that is intended to be in contact with the electrolyte) is less thick than the others or at least is less thick than the layer that is immediately underneath it.

It is in particular possible to use layers that have a thickness of at least 1 μm and/or less than 10 μm.

Optionally, it is possible to use different materials for each of the layers of the first electrode, or for at least two of them.

Conventionally, the manufacture of the device of the invention, in the case of an electrochemical energy storage device, continues with the formation of the electrolyte 13 and then the formation of the second electrode and of the second collector respectively bearing the reference 14 and the reference 15 in FIG. 6. Optionally, the second electrode 14 may be manufactured using the method previously described for the first. The support for the deposition of the layer or layers for forming the second electrode 14 may be the electrolyte 13.

FIG. 7 gives an illustration of the appreciable technical progress afforded by the present invention. It depicts two electrical capacity/voltage curves for two micro-batteries otherwise equivalent but which are differentiated by the formation of the first electrode thereof. In a first case, it is a first electrode produced by the invention in three layers each of 3 μm of $LiCoO_2$. In the other case, the first electrode is of the same material but formed in a single piece, in accordance with a conventional method, and a thickness of 10 μm. Despite a slightly greater thickness in the second case, the behaviour of the micro-battery is of much lower quality, having regard to the difference in capacity observed.

The invention is not limited to the embodiments described above and extends to all embodiments covered by the claims.

The invention claimed is:

1. A method for producing an electrode, for an electrochemical energy storage device, wherein the electrode is obtained by formation of a plurality of stacked layers, said method comprising:
   i) a production of a first electrode layer by physical vapour deposition on a support, said deposition producing defects forming, in the first electrode layer, projecting reliefs;
   ii) a formation of a masking layer on the first electrode layer, configured to be sufficiently fine so as to not completely cover the reliefs, so as to cover a first portion of an exposed surface of the first electrode layer without covering a second, non-masked, portion of the exposed surface of the first electrode layer, the second portion comprising reliefs having an extension, in a thickness dimension of the electrode, greater than a maximum extension, along the thickness dimension of the electrode, of the first portion;

iii) a removal of material of the first electrode layer by applying an etching solution to the first electrode layer as from the second portion;

iv) an elimination of the masking layer;

v) a production of a second electrode layer immediately on top of the exposed surface of the first electrode layer.

2. The method according to claim 1, wherein the second electrode layer is produced by physical vapour deposition.

3. The method according to claim 1, wherein LiCoO2 is used for producing at least one from among the first electrode layer and the second electrode layer.

4. The method according to claim 1, comprising a production of at least a third electrode layer above the second electrode layer by reiterating steps (ii) to v).

5. The method according to claim 1, wherein the thickness of a last electrode layer of the electrode, furthest away from the first electrode layer, is less than those of the other electrode layers.

6. The method according to claim 1, wherein the formation of a masking layer comprises the formation of at least one pattern passing right through the thickness of the masking layer so as to expose a third portion of the first electrode layer, the removal being configured so as to produce a removal of additional material as from the third portion.

7. A method for manufacturing an electrochemical energy storage device, comprising a production of at least a first electrode by implementing the method according to claim 1.

8. The method according to claim 7, comprising a formation of a first collector on a support and then the production of the first electrode on the first collector.

9. The method according to claim 7, wherein the formation of masking layer comprises a step of depositing resin by spin coating.

* * * * *